United States Patent
Li et al.

(10) Patent No.: US 8,660,292 B2
(45) Date of Patent: *Feb. 25, 2014

(54) MULTIFUNCTIONAL VIBRATOR

(75) Inventors: Lin-zhen Li, Shenzhen (CN); Suo-He Wei, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/190,524

(22) Filed: Jul. 26, 2011

(65) Prior Publication Data

US 2012/0170792 A1   Jul. 5, 2012

(30) Foreign Application Priority Data

Jan. 5, 2011   (CN) .................. 2011 2 0001499 U

(51) Int. Cl.
*H04R 11/02*   (2006.01)

(52) U.S. Cl.
USPC ........... 381/412; 381/420; 381/421; 381/396; 381/398

(58) Field of Classification Search
USPC ............. 381/396, 398, 412, 420–421; 310/81
See application file for complete search history.

(56) References Cited

U.S. PATENT DOCUMENTS

| | | | |
|---|---|---|---|
| 7,003,130 B2* | 2/2006 | Chung | 381/396 |
| 7,065,225 B2* | 6/2006 | Stiles | 381/412 |
| 7,245,049 B2* | 7/2007 | Aihara | 310/15 |
| 7,692,346 B2* | 4/2010 | Kobayashi et al. | 310/81 |
| 8,270,661 B2* | 9/2012 | Sorensen et al. | 381/421 |
| 2011/0293134 A1* | 12/2011 | Huang | 381/412 |
| 2012/0106774 A1* | 5/2012 | Saiki | 381/412 |

* cited by examiner

*Primary Examiner* — Brian Ensey
*Assistant Examiner* — Sabrina Diaz
(74) *Attorney, Agent, or Firm* — Anova Law Group, PLLC

(57) ABSTRACT

A multifunctional vibrator includes a frame, a vibrating unit receiving in the frame and including a magnetic circuit part with a magnetic gap, a plurality of elastic members connecting the vibrating unit and the frame, and a voice coil partially inserted into the magnetic gap. Each elastic member includes a retaining portion assembling to an inner face of the frame, a connecting portion attached to the vibrating unit, and an elastic portion extending from the retaining portion to the connecting portion along a devious way. The elastic portion of elastic members includes a first arm capable of generating elastic deformation along a short axis direction of the vibrating unit and a second arm capable of generating elastic deformation along a long axis direction of the vibrating unit.

7 Claims, 5 Drawing Sheets

MULTIFUNCTIONAL VIBRATOR

FIELD OF THE INVENTION

The present disclosure relates to a vibrator, and more particularly to an multifunctional vibrator with elastic members.

DESCRIPTION OF RELATED ART

With the rapid development of the portable device such as cellular phones, people request for more and more functions with audible sensations. In the field of music enjoying of cellular phones, a multifunction device enabling providing both audible and tactile sensations for amusement has already been widely used, which boosts the quick development of multifunctional device.

A related vibrator comprises a frame, a vibrating unit receiving in the frame, elastic members connecting to the frame and the vibrating unit for sustaining the vibrating unit. The elastic members are capable of generating elastic deformation and include a retaining portion attached to the frame, a connecting portion attached to the vibrating unit, and an elastic portion extending from the retaining portion to the connecting portion. However, the above mentioned elastic members typically enable generating deformation only along one direction, which limits the vibrating amplitude of the vibrating unit, and leads to damage of inner components of the vibrator during falling off.

Therefore, it is necessary to provide a new multifunctional vibrator for solving the problem mentioned above.

DETAILED DESCRIPTION OF THE EMBODIMENT

Reference will now be made to describe the exemplary embodiment of the present invention in detail.

Figure 1:
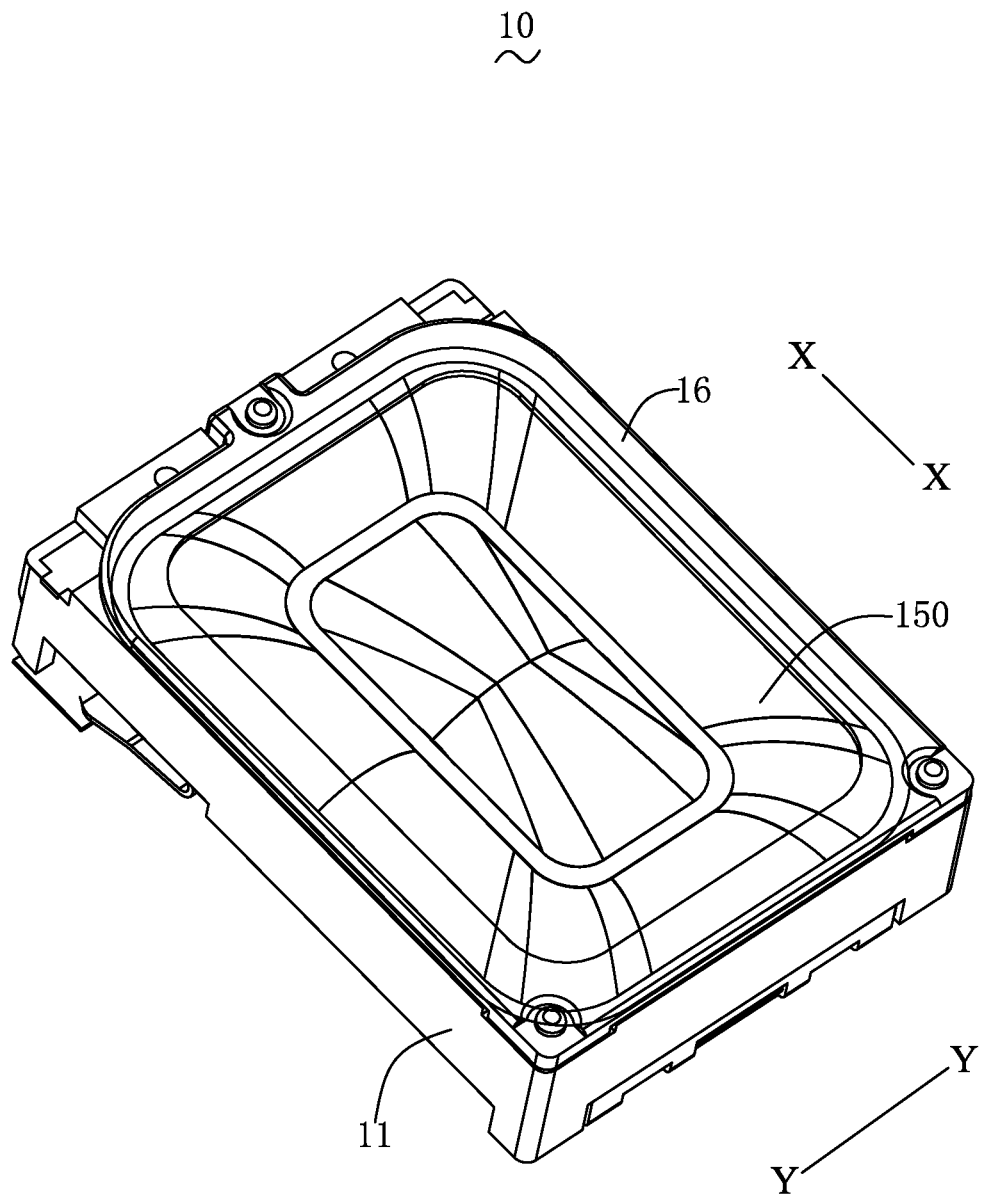
FIG. 1 is an isometric assembled view of a multifunctional vibrator according to an exemplary embodiment of the present disclosure.
Figure 2:
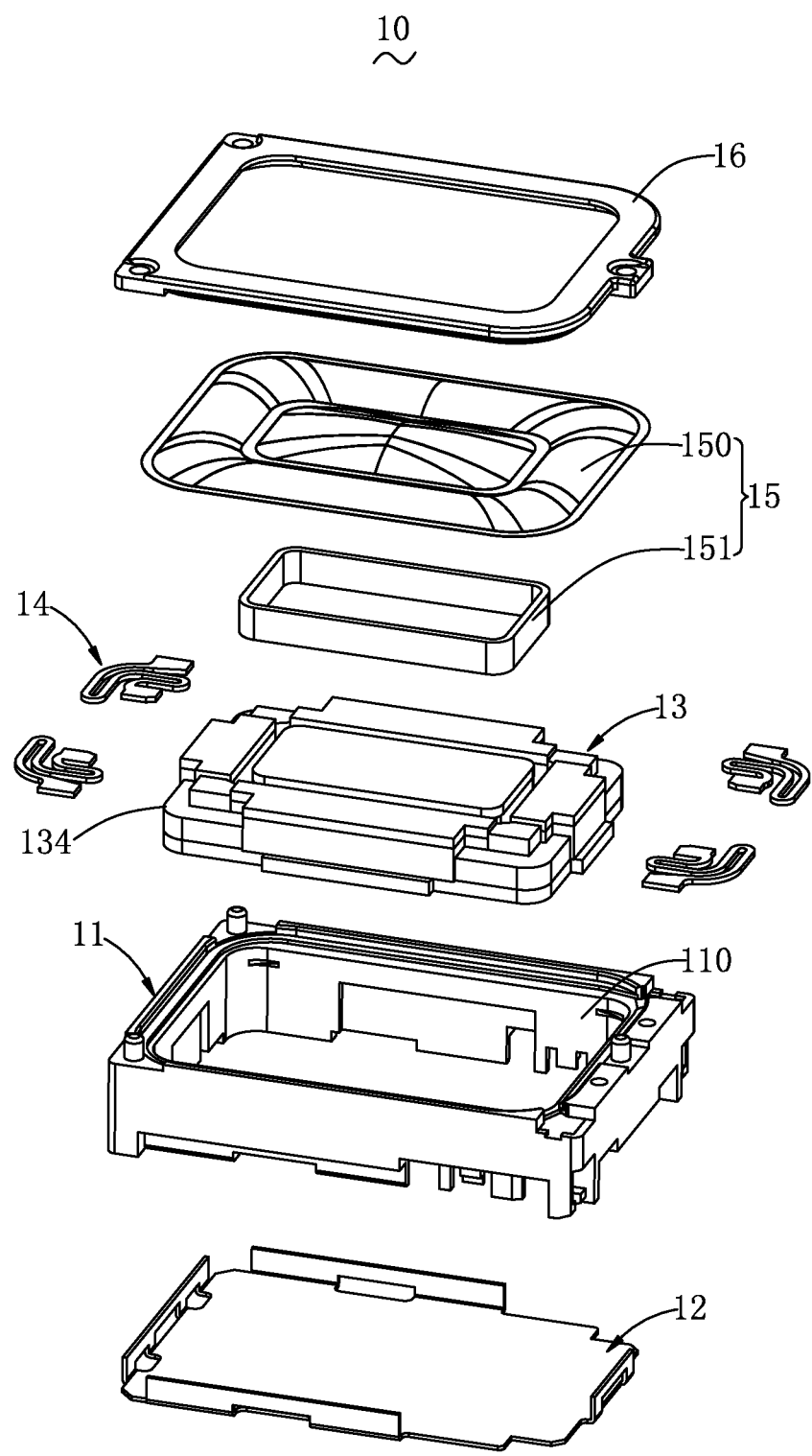
FIG. 2 is an exploded view of the multifunctional vibrator shown in FIG. 1.

Referring to FIGS. 1 and 2, a multifunctional vibrator 10 comprises a frame 11 including an inner face 110, a lower cover 12 engaged with the frame 11, a magnetic circuit part 13 suspended in the frame 11, a plurality of elastic members 14 connecting to the frame 11 and the magnetic circuit part 13, a voice generating unit 15 actuated by the magnetic circuit part 13, and an upper cover 16 protecting the voice generating unit 15. The voice generating unit 15 comprises a diaphragm 150 supported by the frame 11, and a voice coil 151 connected with a lower surface of the diaphragm 150 and actuated by a magnetic field of the magnetic circuit part 13. The upper cover 16 is joined with the periphery of the diaphragm 150. The multifunctional vibrator 10 enables generating both sound and vibration.

In the present exemplary embodiment, a direction of X-X is defined as a long axis direction of the magnetic circuit part 13, a direction of Y-Y is defined as a short axis direction of the magnetic circuit part 13, as shown in FIG. 1.

Figure 3:
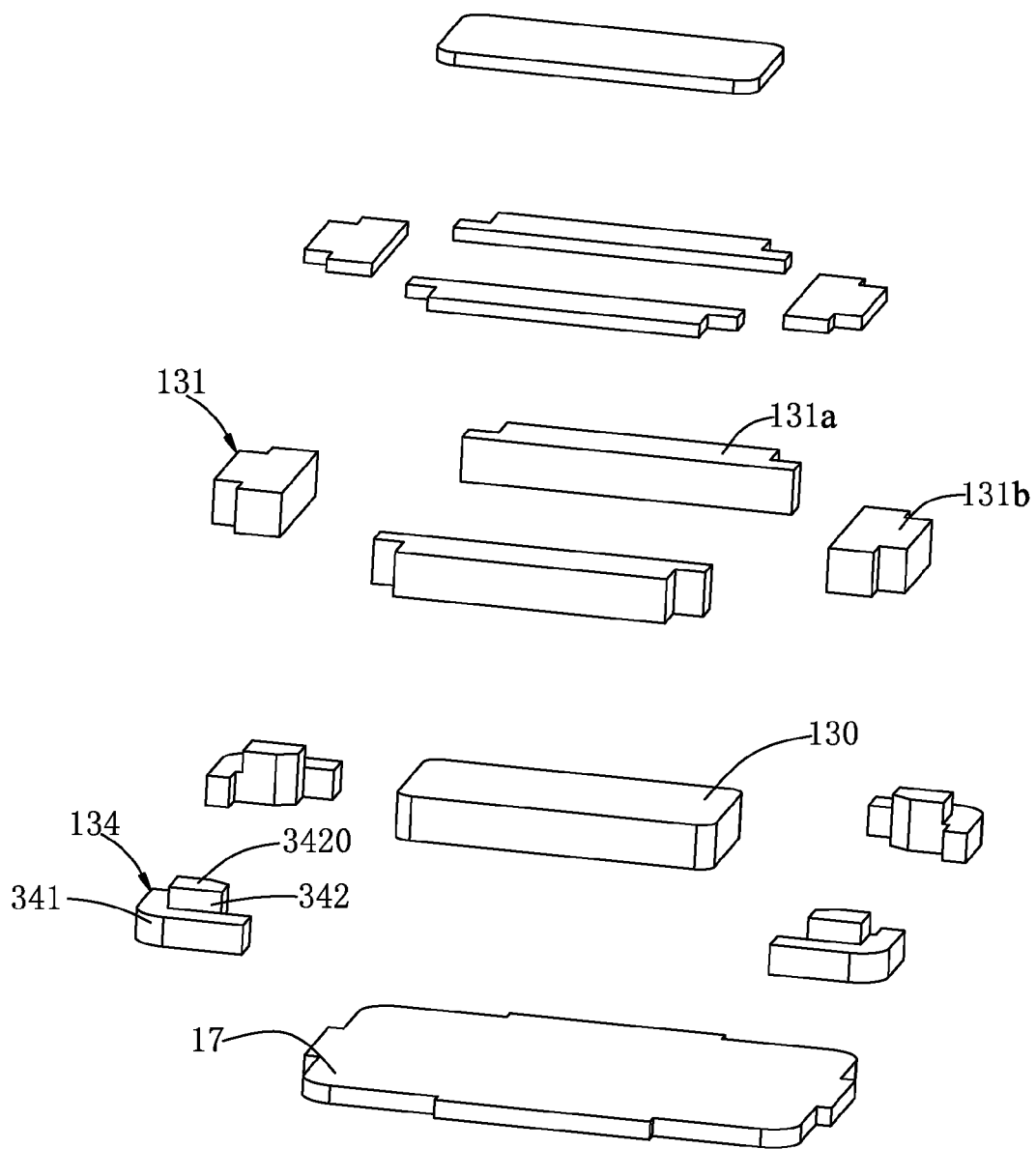
FIG. 3 is an exploded view of a magnetic circuit part of the multifunctional vibrator shown in FIG. 2.
Figure 4:
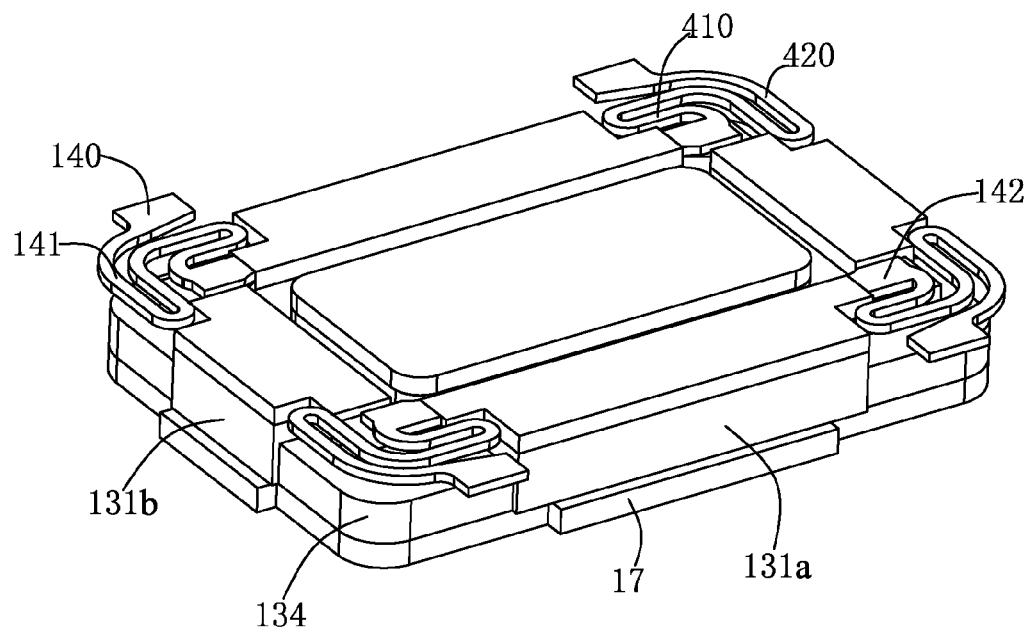
FIG. 4 is a combination of the magnetic circuit part and elastic members of the multifunctional vibrator shown in FIG. 2.
Figure 5:
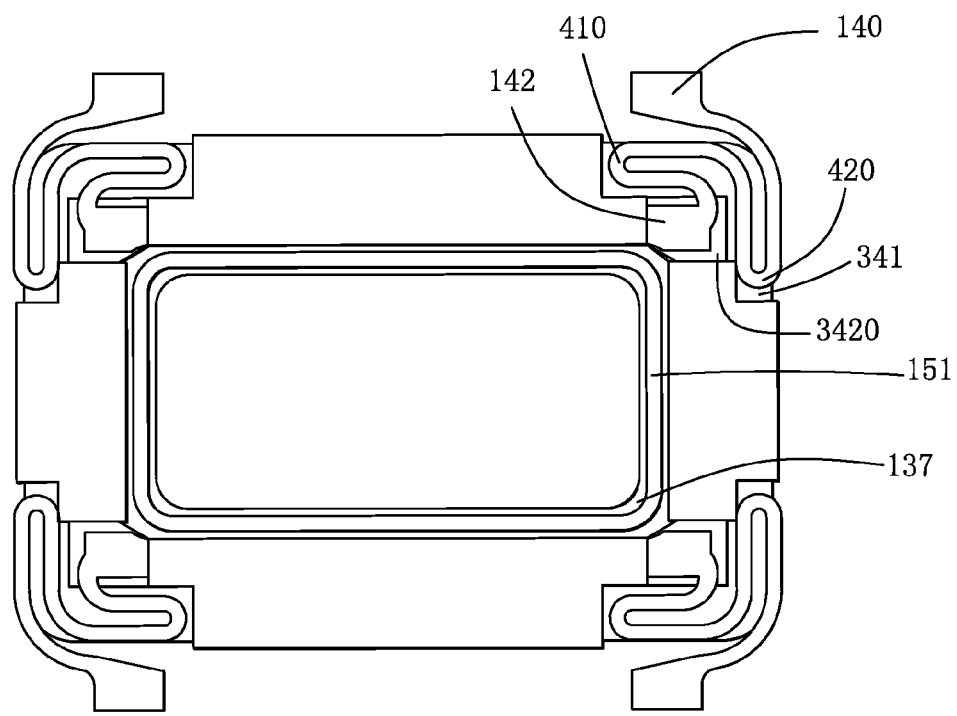
FIG. 5 is a top view of the combination in FIG. 4.

Referring to FIGS. 3-5, the magnetic circuit part 13 includes a pole plate 17, a first magnet 130 positioned at a central portion of the pole plate 17, a plurality of second magnets 131 positioned at a periphery portion of the pole plate 17 and surrounding the first magnet 130. The first magnet 130 has an outline of rectangular block with a pair of long sides along the direction of X-X and a pair of short sides along the direction of Y-Y. The four second magnets 131 are surrounding around four side faces of the first magnet 130.

In the embodiment, four second magnets 131 are provided surrounding the first magnet 130, and include a pair of longer magnets 131a respectively opposed to the long sides of the first magnet 130 and a pair of shorter magnets 131b respectively opposed to the short sides of the first magnet 130. Each of the second magnets 131 forms a receiving gap corporately with an adjacent second magnet 131. Each of the receiving gaps receives a weight 134 therein. A magnetic gap 137 is formed between the first magnet 130 and the second magnets 131 for partially receiving the voice coil 151 (referring to FIG. 5). The combination of the pole plate 17, the first magnet 130, the second magnets 131, and the weights 134 serves as a vibrating unit. Each of the first and second magnets 130,131 is provided with an upper plate attached to top surfaces thereof.

Each weight 134 defines a L-shaped first segment 341, a second segment 342 disposed in a inner corner of the first segment 341 and defining a top face 3420 higher than the upmost face of the first segment 341. The weights 134 are fixed on the pole plate 17.

Figure 6:
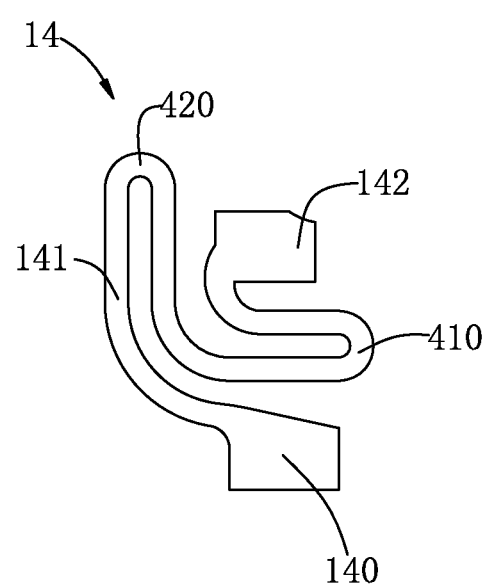
FIG. 6 is a top view of one of the elastic members shown in FIG. 4.

Referring to FIGS. 4-6, in the present exemplary embodiment, four elastic members 14 are provided for sustaining the vibrating member. The four elastic members are disposed on a plane. Each of the elastic members 14 defines a retaining portion 140 assembling to the inner face 110 of the frame 11, a connecting portion 142 attached to the vibrating unit, and an elastic portion 141 extending from the retaining portion 140 to the connecting portion 142 along a devious way. The connecting portion 142 is engaged with the vibrating unit by soldering or adhesive.

The elastic members 14 are positioned above the weights 134 of the vibrating unit. The elastic portions 141 defines a U-shaped first arm 410 roughly extending along the direction of X-X and a U-shaped second arm 420 roughly extending along the direction of Y-Y. The first arm 410 is capable of generating elastic deformation along the direction of Y-Y and the second arm 420 is capable of generating elastic deformation along the direction of X-X, which improves elasticity on a horizontal plane so as to protect the multifunctional electromagnetic transducer 10 from being damaged during falling off. Therefore, each of the elastic members 14 is capable of generating deformation on both the horizontal plane and a vertical plane.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A multifunctional vibrator, comprising:
a frame;

a vibrating unit, including a magnetic circuit part suspended in the frame with a magnetic gap therein;

a plurality of elastic members connecting the frame and the vibrating unit, each elastic member defines a retaining portion attached to the vibrating unit, a connecting portion attached to the frame, and an elastic portion extending from the retaining portion to the connecting portion along a devious way;

a diaphragm supported by the frame;

a voice coil attached to the diaphragm and partially inserted into the magnetic gap; wherein the elastic portion of elastic members includes a first arm capable of generating an elastic deformation along a short axis direction of the vibrating unit and a second arm generating an elastic deformation along a long axis direction of the vibrating unit; wherein the magnetic circuit part includes a pole plate, a first magnet fixed at a central portion of the pole plate, a plurality of second magnets disposed surrounding the first magnet, each of the second magnets is forming a receiving gap corporately with an adjacent second magnet, each of the receiving gaps receives a weight disposed on the pole plate.

2. The multifunctional vibrator as described in claim 1, wherein the elastic portion has a roughly L-shaped configuration, the first arm is U-shaped and extending along the long axis direction of the vibrating unit, the second arm is U-shaped and extending along the short axis direction of the vibrating unit.

3. The multifunctional vibrator as described in claim 2, wherein the magnetic circuit part includes four separate second magnets fixed at a periphery of the pole plate.

4. The multifunctional vibrator as described in claim 3, wherein each weight defines an L-shaped first segment and a second segment disposed in an inner corner of the first segment, a top face of the second segment is higher than an upmost face of the first segment.

5. The multifunctional vibrator as described in claim 4, wherein four elastic members are positioned above the weights.

6. The multifunctional vibrator as described in claim 5, wherein the retaining portion of each elastic member is fixed on the top face of the second segment of the weight.

7. The multifunctional vibrator as described in claim 6, wherein the elastic portion of each elastic member is disposed directly above the first segment of the weight and keeps distance therebetween.

\* \* \* \* \*